(12) United States Patent
Itou

(10) Patent No.: US 8,390,828 B2
(45) Date of Patent: Mar. 5, 2013

(54) IMAGE FORMING APPARATUS

(75) Inventor: Shigeharu Itou, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 1721 days.

(21) Appl. No.: 11/339,961

(22) Filed: Jan. 26, 2006

(65) Prior Publication Data

US 2006/0164669 A1    Jul. 27, 2006

(30) Foreign Application Priority Data

Jan. 27, 2005  (JP) ................................. 2005-020276
Jan. 27, 2005  (JP) ................................. 2005-020277
Jan. 27, 2005  (JP) ................................. 2005-020278
Jan. 27, 2005  (JP) ................................. 2005-020279

(51) Int. Cl.
  *G06F 3/12*   (2006.01)
  *G06K 15/00*  (2006.01)
(52) U.S. Cl. ..................... 358/1.13; 358/1.15
(58) Field of Classification Search ......... 358/1.13–1.16
  See application file for complete search history.

(56) References Cited

U.S. PATENT DOCUMENTS 5,363,204 A * 11/1994 Millman ................. 358/406
5,768,657 A   6/1998 Kimura et al.
6,614,454 B1* 9/2003 Livingston .............. 715/781
2001/0012124 A1  8/2001 Morikawa
2001/0028808 A1  10/2001 Nomura et al.
2002/0048413 A1* 4/2002 Kusunoki .................. 382/282
2002/0146256 A1* 10/2002 Sekiguchi et al. ............. 399/82
2003/0093768 A1* 5/2003 Suzuki ....................... 717/100
2004/0125414 A1* 7/2004 Ohishi et al. ................ 358/402
2005/0052679 A1* 3/2005 Green et al. ................. 358/1.14

FOREIGN PATENT DOCUMENTS

| CN | 1447584 | 10/2003 |
| JP | 1241569 | 9/1989 |
| JP | 11194669 | 7/1999 |
| JP | 2001-180085 A | 7/2001 |
| JP | 2001-272884 A | 10/2001 |
| JP | 2003-241576 A | 8/2003 |
| JP | 2004-328444 A | 11/2004 |

* cited by examiner

*Primary Examiner* — Dov Popovici
(74) *Attorney, Agent, or Firm* — Ditthavong Mori & Steiner, P.C.

(57) ABSTRACT

An image forming apparatus determines if a support function key is pressed down or not. When it is determined that the support function key is pressed down, the image forming apparatus determines if the read document is a one side document or a both-side document. Then the document is read and operable operational conditions are selected based on the read document and the information about an intended use that is inputted by a user. The selected operational conditions are displayed on an operating unit for each operational condition. As a result, it is possible to provide an image forming apparatus wherein the user can set a desired operational condition easily suitable for the user's intended use without omission and fail.

1 Claim, 17 Drawing Sheets

IMAGE FORMING APPARATUS

BACKGROUND OF THE INVENTION

1. Field of the Invention

The present invention relates to an image forming apparatus, and particularly, to an image forming apparatus which can be easily operated.

2. Description of the Related Art

The image forming apparatus, wherein operating unit has a plurality of display screens displaying different display items and user can select a desired display screen in accordance with the user's preference, is disclosed in, for example, Japanese Unexamined Patent Publication No. 11-194669. According to Japanese Unexamined Patent Publication No. 11-194669, a visibility and user-friendliness of the operating unit are improved by making the user select either the display screen having few display items or the display screen having many display items and operate the image forming apparatus through the selected display screen.

According to this publication, even if the user selects the display screen having few display items, it is possible that the user cannot set the desired operational condition by selecting the displayed item and an unnecessary item is displayed. In this case, although there are only a small number of display items, it is possible that the user makes a mistake in setting of the operational condition and it may be difficult for the user to set the desired operational condition. Further, the user has an intended use of an image to be formed when the user is to form the image such as copy. However, it is not always easy for the user to set the operational condition for the user's intended use even if the user has selected an optimum display screen from a plurality of display screens. This is because it is not necessarily possible to set the operational condition suitable for the user's intention from the displayed screen. Moreover, even if the image forming apparatus has the operational condition suitable for the user's intended use, the user possibly forgets to set the operational condition.

In addition, Japanese Unexamined Patent Publication No. 1-241569, for example, discloses an image forming apparatus having a plurality of operational modes with each of them having a plurality of operational conditions. According to this publication, the operational condition set by the user in one operational mode is displayed on a set state display screen of another operational mode.

It is convenient for the user to use this image forming apparatus, since the content of the operational condition set by the user is displayed on a selection condition display screen of another operational mode than the original set mode as a list. However, when the content of the operational condition that has been set is to be changed, the user must return to the original set mode screen from which the user can reset the set content and this is troublesome.

SUMMARY OF THE INVENTION

Thus, an object of the present invention is to provide an image forming apparatus wherein a desired operational condition for the user's intended use can be set without omission and fail.

Another object of the present invention is to provide an image forming apparatus wherein inoperable operational conditions will not be set by mistake and the desired operational condition can be set easily.

Yet another object of the present invention is to provide an image forming apparatus having a plurality of operational modes with each of them having a plurality of operational conditions, wherein the set content of the operational condition that has been already set can be changed without returning to the original set mode screen from which the user has set.

Further object of the present invention is to provide an image forming apparatus wherein unfeasible operational conditions will not be set even by mistake and the desired operational condition can be set easily in accordance with the user's intended use.

The above-described objects of the present invention can be attained by the image forming apparatus having the elements as follows; namely, the image forming apparatus according to the present invention comprises a reading unit for reading a document; an image forming unit for forming an image on the basis of a document that is read by the reading unit; an operating unit for setting an operational condition in forming an image by the image forming unit; an input unit for making a user input the information about an intended use in forming an image; and a display unit for displaying an operable operational condition in forming an image on the operating unit in turn for each operational condition in accordance with the user's request on the basis of a reading result of the document read by the reading unit and the input information about the intended use to be inputted into the input unit.

According to the present invention, in accordance with the user's request, the operable operational condition is displayed on the operating unit in turn for each operational condition on the basis of the document read by the reading unit and the information about the intended use inputted by the user.

As a result, it is possible to provide an image forming apparatus wherein a desired operational condition for the user's intended use can be set easily without omission and fail.

Preferably, the display unit may display the operable operational conditions on the operating unit in turn for each operational condition on the basis of the number of document read by the reading unit and the input information of an intended use inputted into the input unit.

According to the other aspect of the present invention, an image forming apparatus comprises a reading unit for reading a document; an image forming unit for forming an image on the basis of a document that is read by the reading unit; an operating unit for setting an operational condition in forming an image by the image forming unit; an input unit for making a user input the information about an intended use in forming an image; a selecting unit for selecting an operable operational condition in forming an image on the basis of a reading result of the document read by the reading unit and the input information about the intended use inputted into the input unit; and a display unit for displaying the operational condition that is selected by the selecting unit on the operating unit in turn for each operational condition in accordance with the user's request.

Preferably, the operational condition to be displayed by the display unit can be decided by the user.

More preferably, the user can set the operational condition with respect to each of the operational conditions that are displayed on the operating unit; and the display unit displays the operable operational conditions on a first region of the operating unit and displays the operational condition that has been set by the user from the operable operational conditions on a second region that is different from the first region of the operating unit.

An image forming apparatus of the still other aspect of the present invention comprises a reading unit for reading a document; an image forming unit for forming an image on the basis of a document read by the reading unit; an operating unit for setting an operational condition in forming an image by the image forming unit; and a display unit for displaying only an operable operational condition in forming an image on the operating unit in accordance with a user's request on the basis of a reading result of the document read by the reading unit.

According to the still other aspect of the present invention, in accordance with the user's request, only the operable operational condition is displayed on the operating unit on the basis of the document read by the reading unit.

As a result, it is possible to provide an image forming apparatus, wherein inoperable operational conditions will not be selected by the user mistakenly and the desired operational condition can be set easily.

Preferably, an image forming apparatus may include the display unit for displaying only the operable operational condition on the operating unit on the basis of the number of the document read by the reading unit.

An image forming apparatus of the further other aspect of the present invention comprises a reading unit for reading a document; an image forming unit for forming an image on the basis of a document that is read by the reading unit; an operating unit for setting an operational condition in forming an image by the image forming unit; a selecting unit for selecting an operable operational condition in forming an image on the basis of a reading result of the document read by the reading unit; and a display unit for displaying only the operational condition that is selected by the selecting unit on the operating unit in accordance with the user's request.

According to the further aspect of the present invention, an image forming apparatus can be operated by setting each of plural operational conditions with each of them having a plurality of options and the image forming apparatus comprises an operating unit for making a user set the plural operational conditions separately; wherein the operating unit includes an operational condition displaying portion for displaying the plural operational conditions for each operational condition in turn, and a set state displaying portion, which is provided separately from the operational condition displaying portion and serves to display the operational condition set by the user from the plural operational conditions; and a set condition changing unit for changing the set content of the operational condition on the set state displaying portion in accordance with the user's request that has been set and displayed on the set state displaying portion.

According to the further aspect of present invention, in accordance with the user's request, it is possible to change the set content of the operational condition that has been set by the set state displaying portion.

As a result, it is possible to provide the image forming apparatus having a plurality of operational modes with each of them having a plurality of operational conditions wherein the set content of the operational condition that has been already set can be changed without returning to the original set mode screen from which the user set.

Preferably, the set condition changing unit cancels the operational condition that has been set.

More preferably, the operational condition displaying portion and the set state displaying portion are displayed in accordance with the user's request.

According to the still further other aspect of the present invention, an image forming apparatus comprises a reading unit for reading a document; an image forming unit for forming an image on the basis of a document that is read by the reading unit; an operating unit for setting an operational condition in forming an image by the image forming unit; an input unit for making a user input the information about an intended use in forming an image; and a display unit for displaying an operable operational condition in forming an image on the operating unit in turn for each operational condition in accordance with the user's request on the basis of a reading result of the document read by the reading unit and the input information about the intended use inputted into the input unit.

According to the still further aspect of the present invention, in accordance with the user's request, the operable operational condition is displayed on the operating unit on the basis of the document read by the reading unit and the information of the intended use inputted by the user.

As a result, it is possible to provide an image forming apparatus, wherein the user will not select by mistake the operational condition that cannot be operated and the desired operational condition can be set in accordance with the user's intended use.

Preferably, the display unit displays the operable operational condition in forming an image on the operating unit on the basis of the number of the document read by the reading unit and the input information about the intended use to be inputted into the input unit.

According to yet further aspect of the present invention, an image forming apparatus comprises a reading unit for reading a document; an image forming unit for forming an image on the basis of a document that is read by the reading unit; an operating unit for setting an operational condition in forming an image by the image forming unit; an input unit for making a user input the information about an intended use in forming an image; a selecting unit for selecting an operable operational condition in forming an image on the basis of a reading result of the document read by the reading unit and the input information about the intended use inputted into the input unit; and a display unit for displaying the operational condition that is selected by the selecting unit on the operating unit in accordance with the user's request.

Preferably, the image formation unit has a predetermined operational condition, the operating unit displays the predetermined operational conditions thereon, and the display unit displays the operable operational condition in forming an image with a first brightness from the predetermined operational conditions and displays the inoperable operational condition with a second brightness that is dimmer than the first brightness.

DETAILED DESCRIPTION OF THE INVENTION

Figure 1:
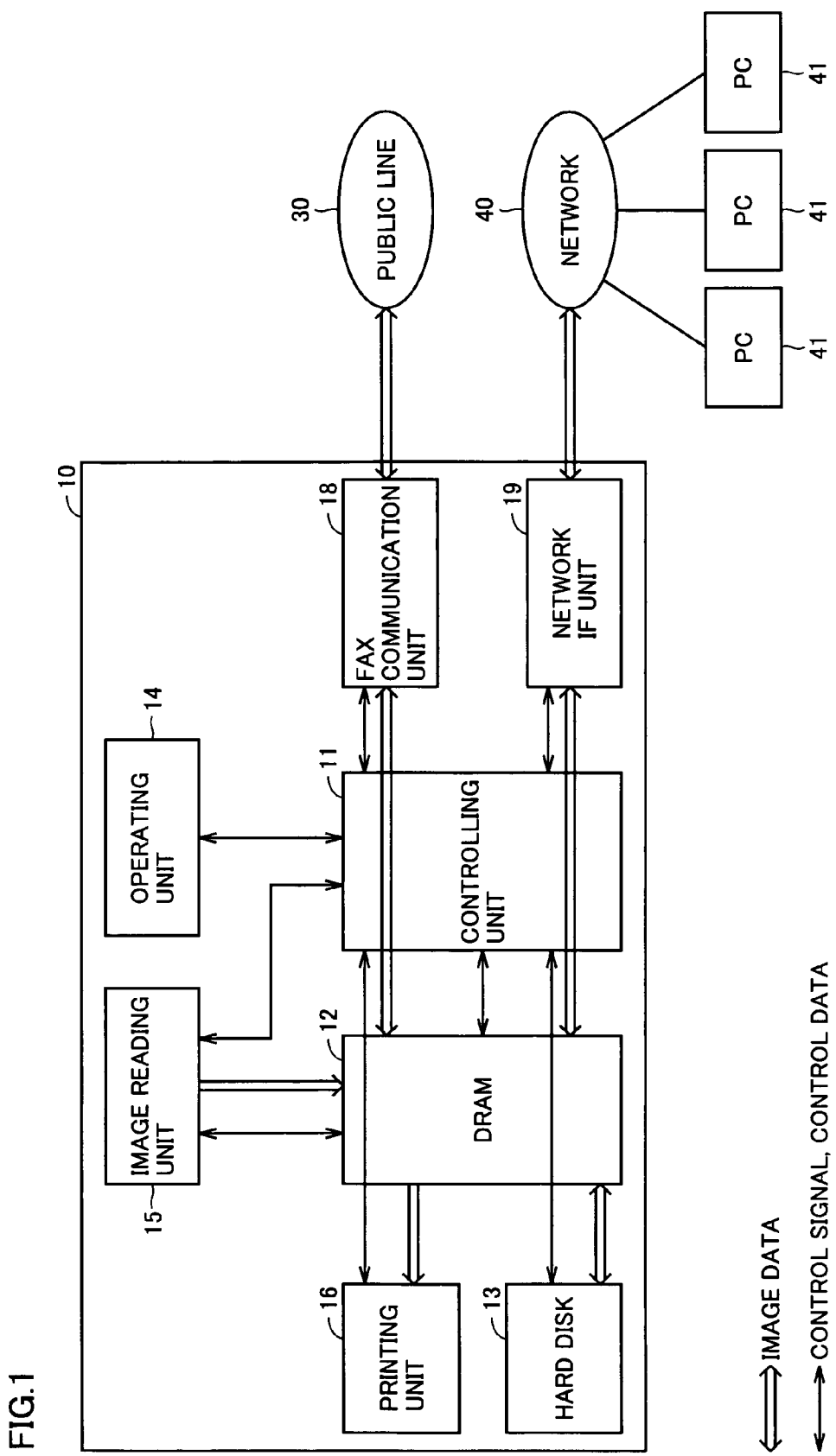
FIG. 1 is a block diagram showing the structure of an image forming apparatus according to an embodiment of the present invention.

The embodiments of the invention will be described below with reference to the drawings. FIG. 1 is a block diagram showing the structure of a multi functional printer when the image forming apparatus according to an embodiment of the present invention is applied to the multi functional printer 10. With reference to FIG. 1, the multi functional printer 10 comprises a control unit 11 for controlling the entire multi functional printer 10, a DRAM 12, a hard disk 13, an operating unit 14, an image reading unit 15 that operates as a reading unit, a printing unit 16 that operates as an image forming unit, a FAX communication portion 18 to be connected to a public line 30, and a network IF (interface) portion 19 to be connected to a network 40.

The control unit 11 writes the data supplied from the image reading unit 15 in the DRAM 12 by compressing and encoding the document data. Then, the control unit 11 reads the data written in the DRAM 12, and expands, decodes and outputs the data from the printing unit 16. In addition, the control unit 11 controls the DRAM 12 for writing and reading the document data, the image reading unit 15, and the hard disk 13.

The multi functional printer 10 functions as a copy machine by forming an image in the printing unit 16 through the DRAM 12 using the document read by the image reading unit 15. In addition, the multi functional printer 10 functions as a fax machine by forming an image in the printing unit 16 through the DRAM 12 using the image data transmitted from the public line 30 through the FAX communication portion 18. Further, the multi functional printer 10 functions as a printer by forming an image in the printing unit 16 through the DRAM 12 using the image data transmitted from a personal computer 41 connected to the network 40 via the network IF portion 19.

In FIG. 1, a bold line arrow represents the flow of the image data and a thin line arrow represents the flow of a control signal or the control data.

Figure 2:
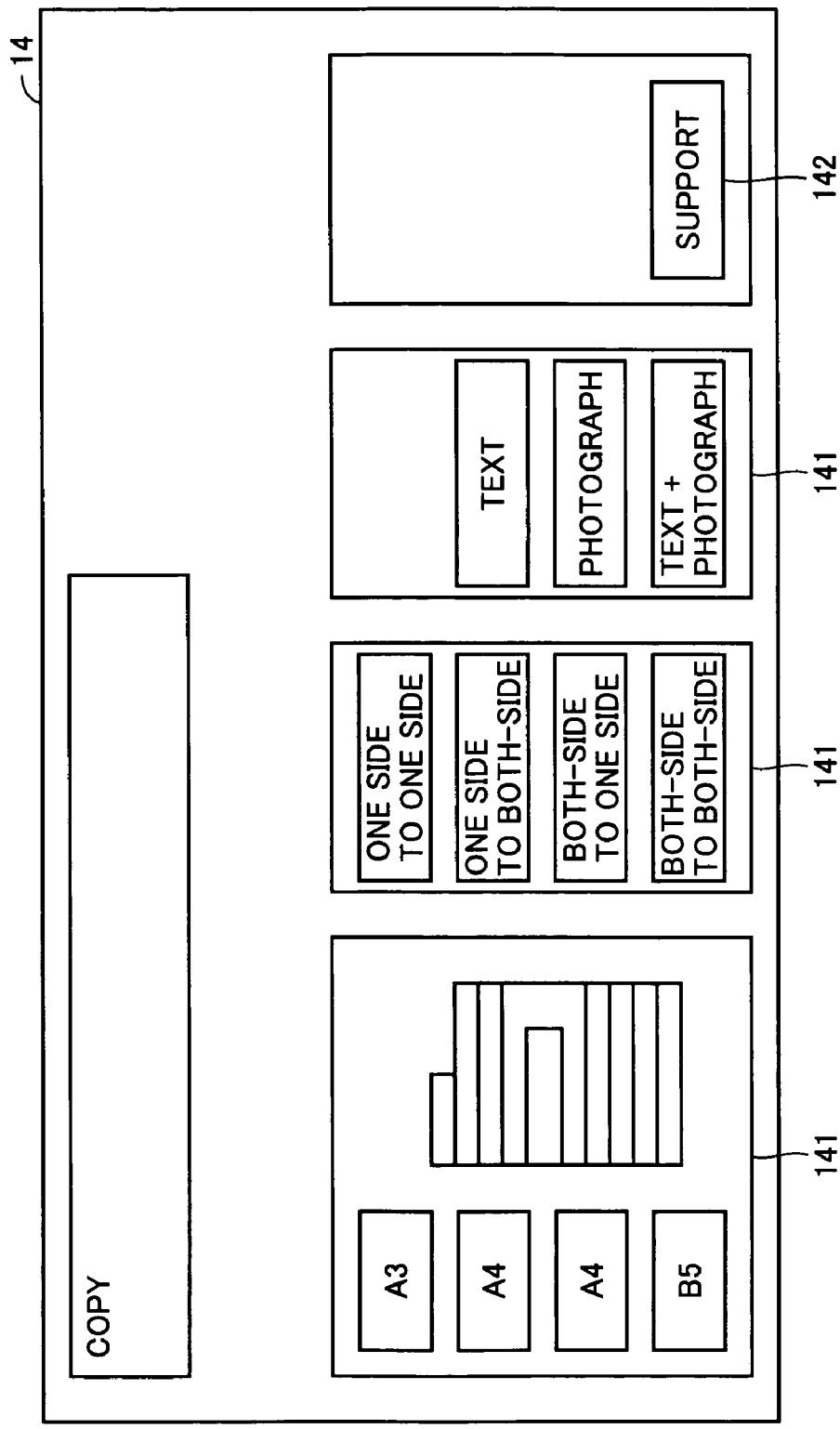
FIG. 2 illustrates a display example of a basic setting screen, on which a normal operational condition of an operating unit of the image forming apparatus according to the embodiment of the present invention is displayed.

FIG. 2 illustrates a basic setting screen, on which a normal operational condition of the operating unit 14 shown in FIG. 1, is displayed. The operating unit 14 comprises a liquid crystal panel and the operating unit 14 can display the information to a user from the multi functional printer 10 and the user can set the desired condition. This liquid crystal panel is a touch panel. In the case of setting the condition such as various modes and so on in forming an image depending on the document, the condition can be set by selecting a condition set key 141 displayed on the touch panel. In addition, a support function key 142 is provided in the operating unit 14 and by pressing down this, the user can use a support function to be described later.

1. First Embodiment

Figure 3:
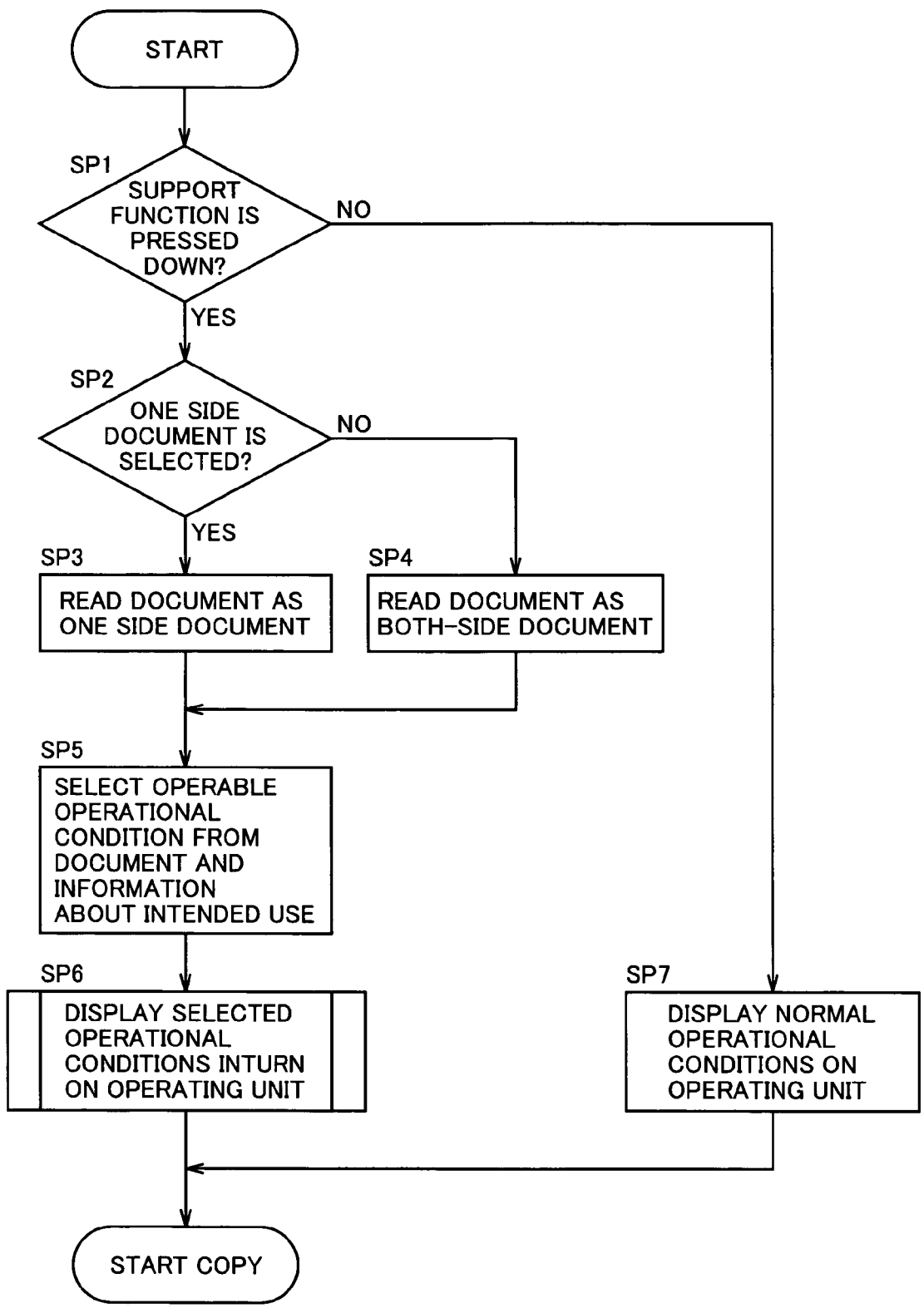
FIG. 3 is a flow chart showing the operation of a control unit in the first embodiment of the present invention wherein the image forming apparatus is used as a copy machine.

Firstly, an operation example wherein the control unit 11 selects an operational condition that is operable according to a first embodiment of the present invention will be described below. FIG. 3 is a flow chart showing the operation of the control unit 11 when the multi functional printer 10 is used as a copy machine. With reference to FIGS. 2 and 3, the operation of the control unit 11 will be described below wherein the document is copied using the support function.

At first, the user selects whether or not to use the support function. The support function means a function to display operable operational conditions on the operating unit 14 in turn for each operational condition on the basis of the reading result of the document and the inputted information about an intended use of the user. In order to use this function, the support function key 142 displayed on the operating unit 14 is pressed down.

Figure 4:
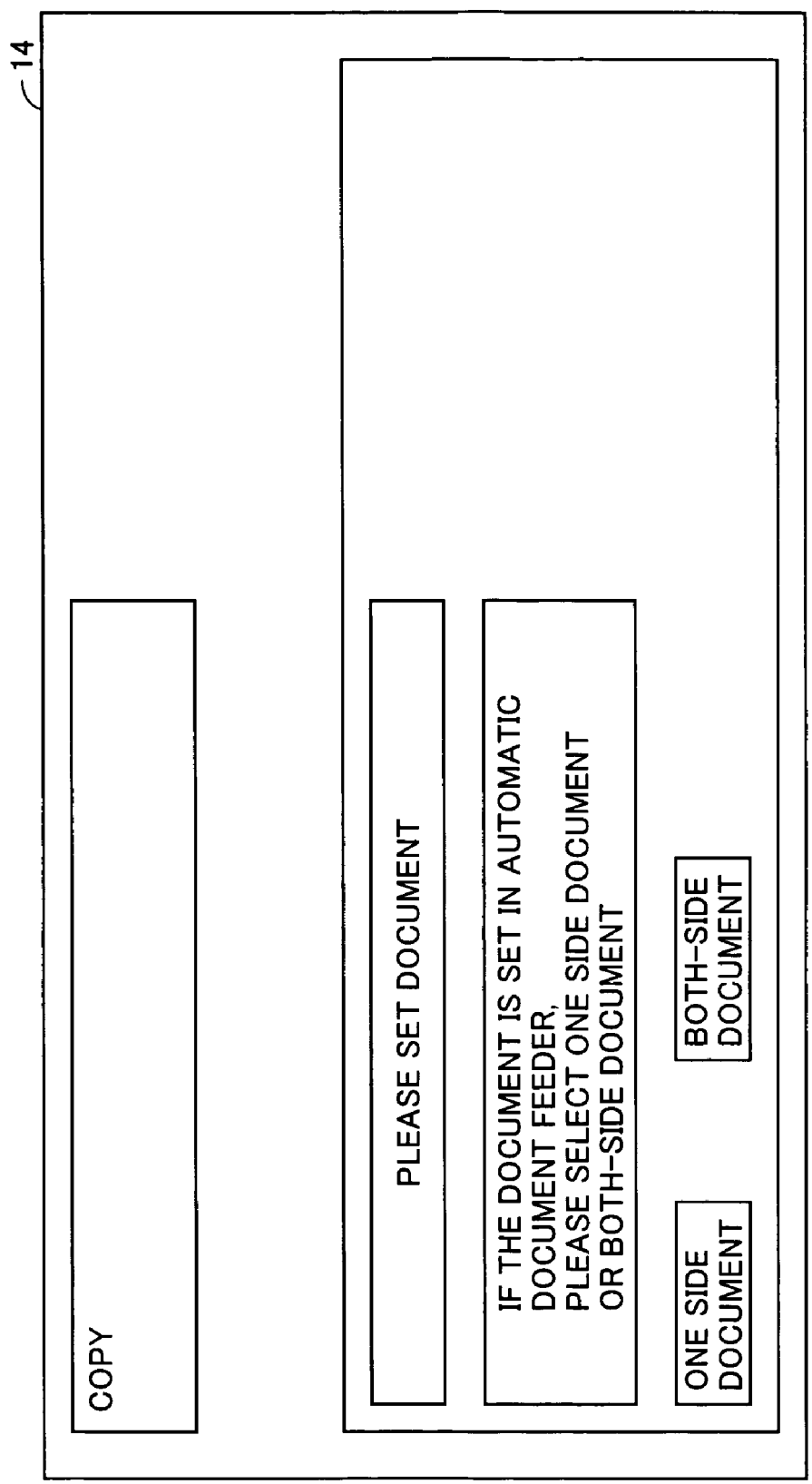
FIG. 4 illustrates a display example of an operating unit of the image forming apparatus according to the first embodiment of the present invention when a support function key is pressed down.

In step (in the drawing, abbreviated as SP) SP1, the control unit 11 determines if the support function key 142 is pressed down or not. If the support function key 142 is pressed down, the display screen shown in FIG. 4 is displayed on the operating unit 14. On this screen, the message of "please set a document" to urge the user to set the document at the image reading unit 15 and the message of "please select one side copy or both-side copy" to urge the user to set the information if the document should be read as an one-side document or not to be set by the user are displayed. In accordance with these messages, the user sets the document at the image reading unit 15. The image reading unit 15 includes an automatic document feeder. When the image is read by the automatic document feeder in step SP2, the user sets either the one side document or both-side document. Further, if the document is not read by the automatic document feeder, the document is read by a document table.

If the automatic document feeder is used, the control unit 11 determines if the document is the one side document or the both-side document. When it is determined that the document is the one side document, the image reading unit 15 reads the document as the one side document in step SP3. On the other hand, when it is determined that the document is the both-side document, the image reading unit 15 reads the document as the both-side document in step SP4.

Figure 5:
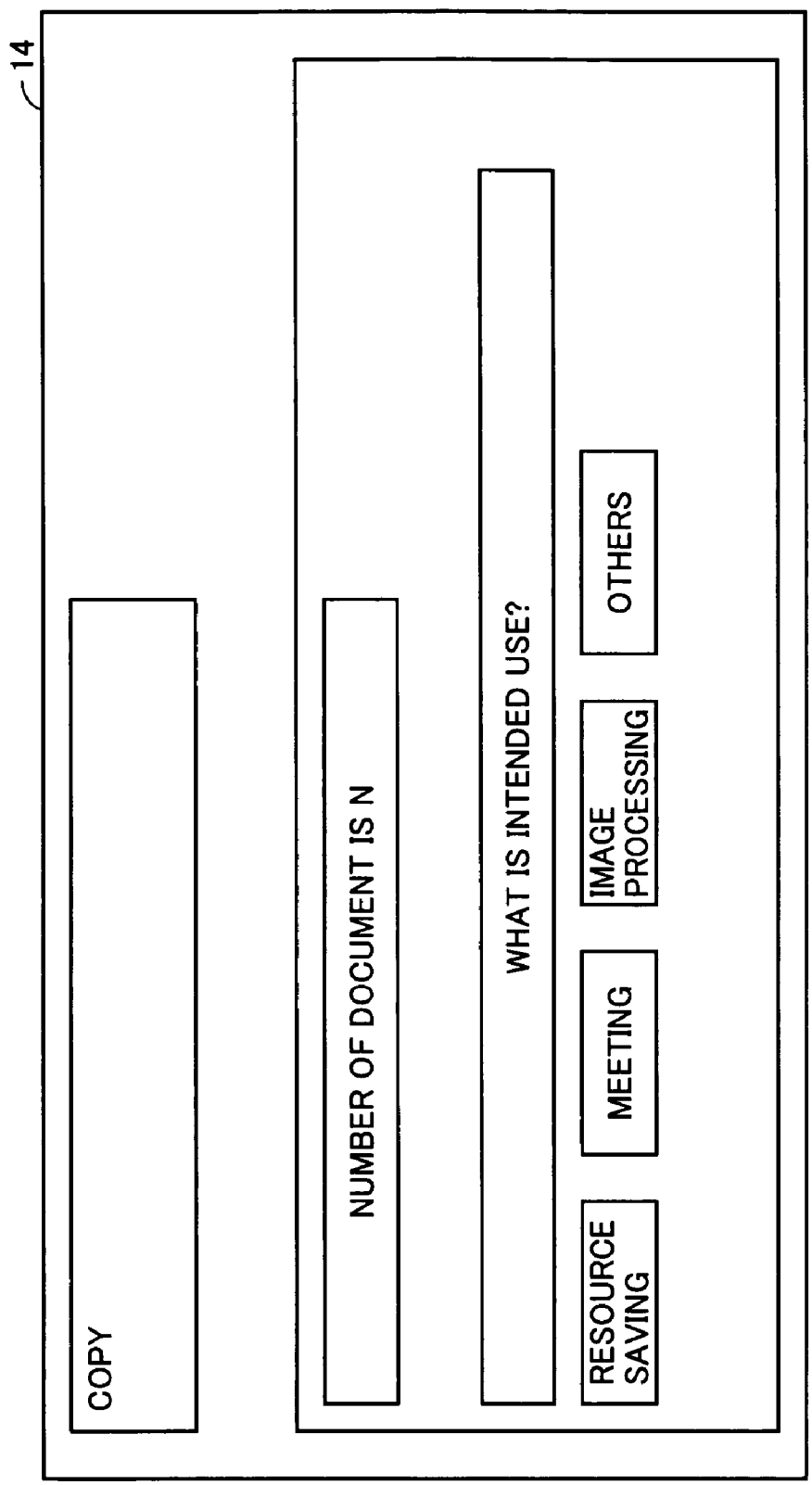
FIG. 5 illustrates a display example of the operating unit for making the user input an intended use of the image forming apparatus according to the first embodiment of the present invention.

After reading the document, in step SP5, the operable operational condition will be selected from the read document and the information about the intended use. FIG. 5 is a display example of the operating unit 14 for making the user input the information about the intended use in this case.

Referring to FIG. 5, after reading the document, the control unit 11 operates as an input unit together with the operating unit 14 to make the user input the information about the intended use in forming an image. In this case, the number of the read document, the inquiry of "what is an intended use?" for prompting the user to input the information about the untended use, and the intended uses such as "resource saving", "for meeting", "image processing", and "others" are displayed. After making the user input the intended use, the control unit 11 operates as a selecting unit to select the operable operational condition for each intended use based on the document and the information about the intended use that is inputted by the user.

Figure 6:
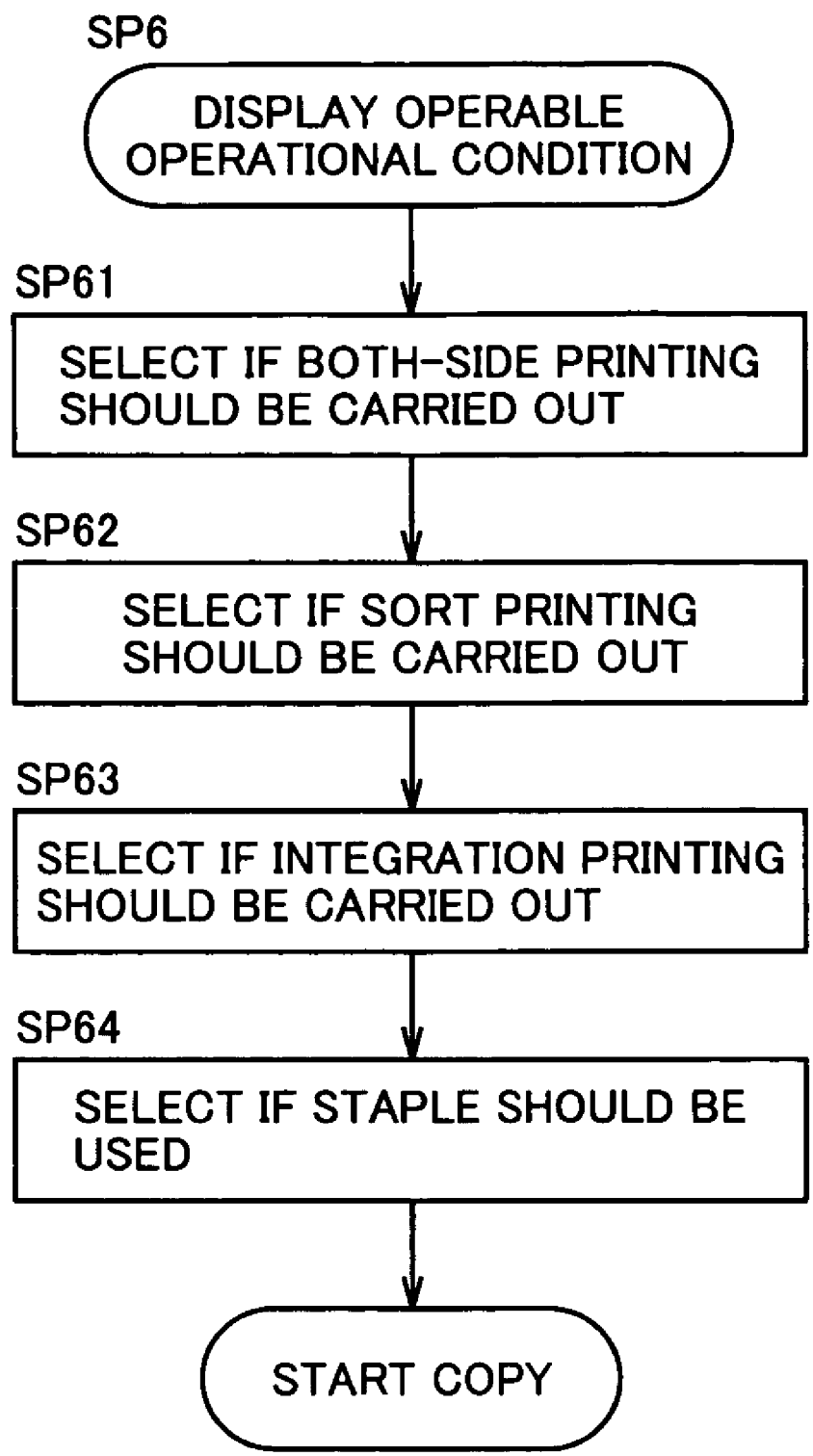
FIG. 6 is an example of a flow chart for selecting the operable operational conditions on the operating unit for each operational condition in turn based on a document and the information about the intended use.

Returning to FIG. 3, after selecting the operable operational condition, the control unit 11 operates as a display unit, and the operable operational condition is displayed on the operating unit 14 in step SP6. FIG. 6 is a flow chart for displaying the operable operational conditions on the operating unit 14 for each operational condition in turn, which is shown in the step SP6. Here, the case that, for example, "resource saving" is inputted is shown. If "resource saving" is selected as the intended use, the operational conditions capable of "saving resource" are displayed on the operating unit 14 in turn. Here, although the case that "resource saving" is intended will be described, the similar processing is performed in "for meeting", "image processing", and "others".

Figure 7:
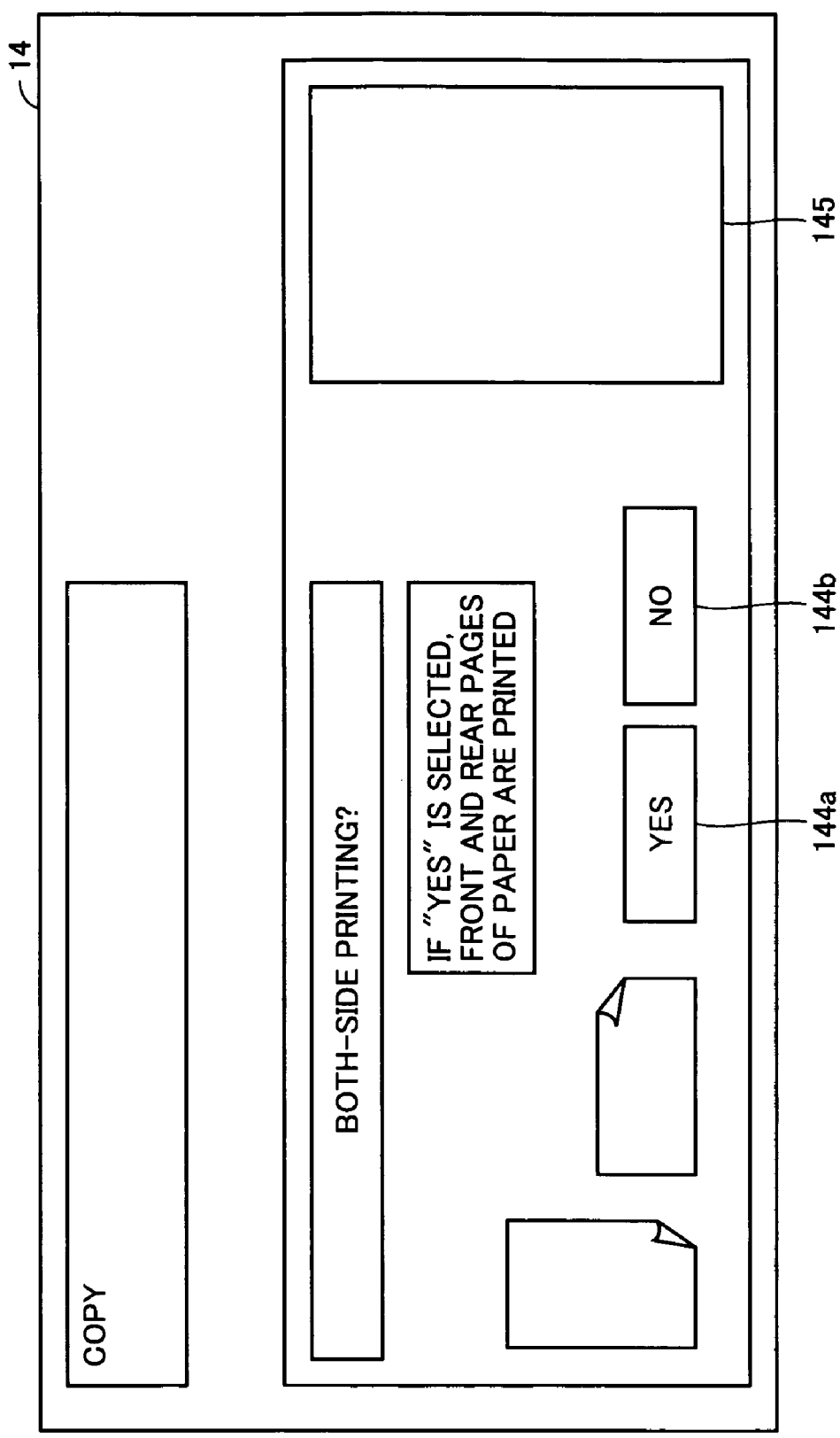
FIG. 7 illustrates an example of a display screen for making the user set if both-side printing is to be carried out or not among the selected operable operational conditions.

Referring to FIG. 6, in order to set if the both-side printing should be carried out or not, at first, the display screen shown in FIG. 7 is displayed on the operating unit 14 (SP 61) among operable operational conditions in the case where "resource saving" is inputted. In this case, an inquiry of "both-side printing?", the explanation of the both-side printing that "if "YES" is selected, front and rear pages of paper are printed", operational condition decision keys 144a and 144b to decide "YES" or "NO" as an option, and a selection condition display area 145 are displayed. The selection condition display area 145 is the area to display the set content of the operational condition that has been already set by the user and this area corresponds to the second region of the operating unit 14. The area adjacent to this selection condition display area 145 is the area to display the operable operational conditions and this area corresponds to the first region of the operating unit 14.

Figure 8:
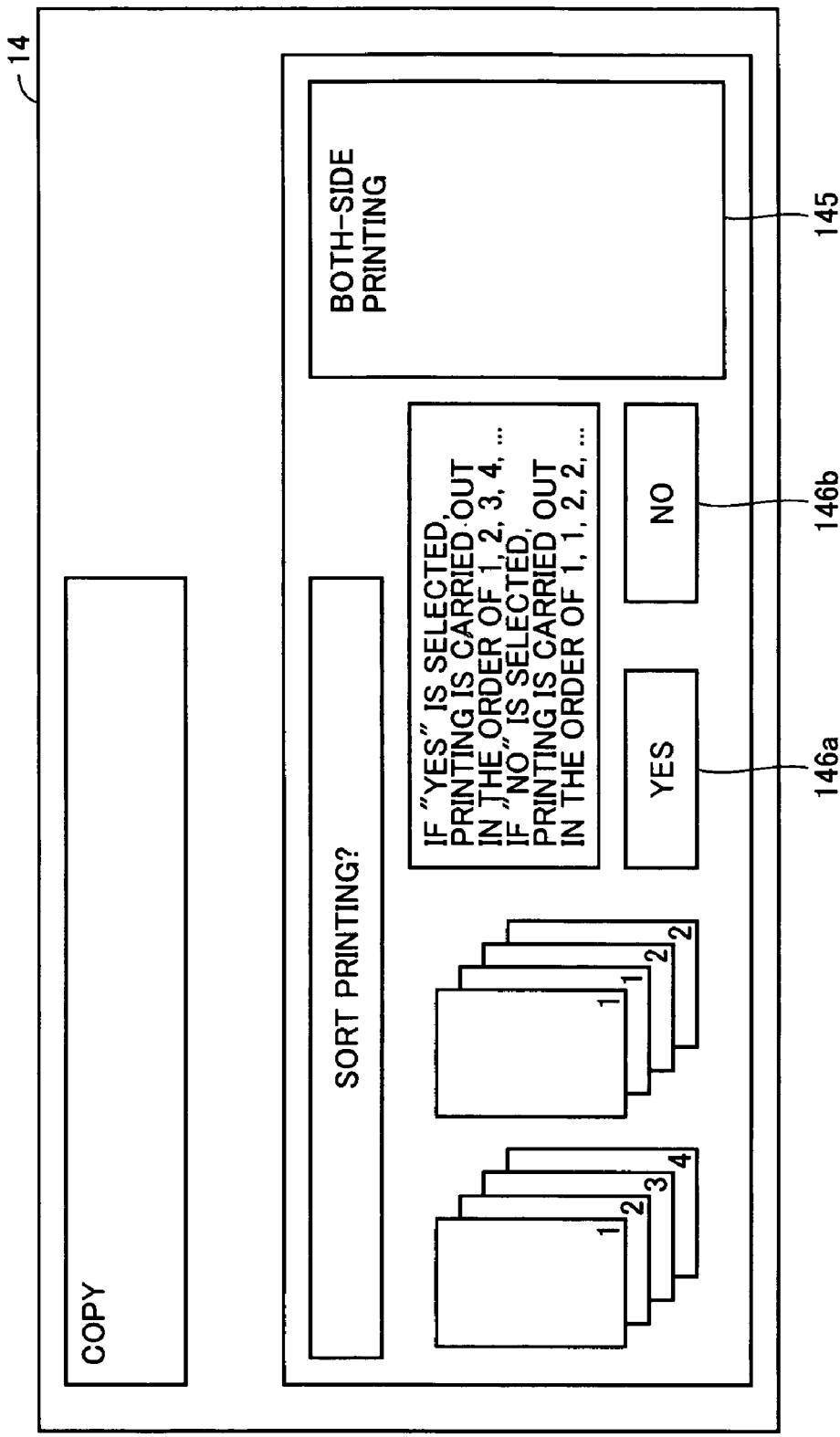
FIG. 8 illustrates an example of a display screen for making the user set if sort printing is to be carried out or not among the selected operable operational conditions.

Here, if the user presses down the operational condition decision key 144a of "YES", the both-side printing is set. After this, the display screen for setting if the sort printing should be carried out or not shown in FIG. 8 is displayed on the operating unit 14 as a next operational condition (step SP62). In this case, an inquiry of "sort printing?", the explanation of the sort printing that "if "YES" is selected, printing is carried out in the order of 1, 2, 3, 4, . . . and if "NO" is selected, printing is carried out in the order of 1, 1, 2, 2, . . . ", operational condition decision keys 146a and 146b, and the selection condition display area 145 are displayed. In this case, on the selection condition display area 145, "both-sides printing" that is the set content of the operational condition set by the user on the previous display screen is displayed.

In FIG. 8, if the user presses down the operational condition decision key 146a, the sort printing is set and the display screen for selecting the operational condition if integration printing should be carried out or not, and the display screen for selecting the operational condition if staple should be used or not are displayed in turn on the operating unit 14 as a next operational condition (steps SP63, SP64). After the user sets the operational condition displayed on each display screen in turn, copying operation is started.

If the user does not press down the support function key 142 (NO in the step SP1), the normal operational condition shown in FIG. 2 is displayed on the operating unit 14 in the step SP7.

As described above, according to this embodiment, since the operational conditions that can be operated when forming an image are displayed for each operational condition in turn on the basis of the reading result of the document read by the image reading unit 15 and the information about the intended use, it is possible to provide an image forming apparatus wherein a desired operational condition for the user's intended use can be set easily without omission and fail.

In addition, since the operational condition that has been already set is displayed on the selection condition display area 145, the user can set each operational condition while checking the set content of the operational condition that has been already set on the previous screen.

Further, in the step SP6, in displaying the selected operable operational condition on the operating unit 14, each operational condition may be decided by the user in advance. For example, in the case where "for meeting" is selected as the intended use on the display screen for setting the operational condition such as "form composition" as the operational condition that is uniquely decided by the user is displayed without relating to selection by the control unit 11. Thus, the operational condition selected by the user as desired can be set.

In addition, the user may decide a display order of the selected operable operational conditions in advance.

According to the above-described embodiment, as an example of selecting the operable operational condition from the document and the information about the intended use, the case of selecting and displaying the operational condition on the basis of the number of the read document and the information about the intended use is explained. However, the present invention is not limited to this example, and the operational condition is selected and displayed on the basis of the image data of the read document and the information about the intended use. For example, when a monochrome document is to be copied, the operational condition decision keys relating to a full color copy are not displayed on the operating unit 14. Thus, the user can select the operational condition more easily in forming an image.

2. Second Embodiment

Next, a second embodiment of the present invention will be described below. Also in the following embodiments including the second embodiment, the structure of the image forming apparatus shown in FIG. 1 and FIG. 2 and the display on the screen of the operating unit 14 are the same as in the first embodiment.

Figure 9:
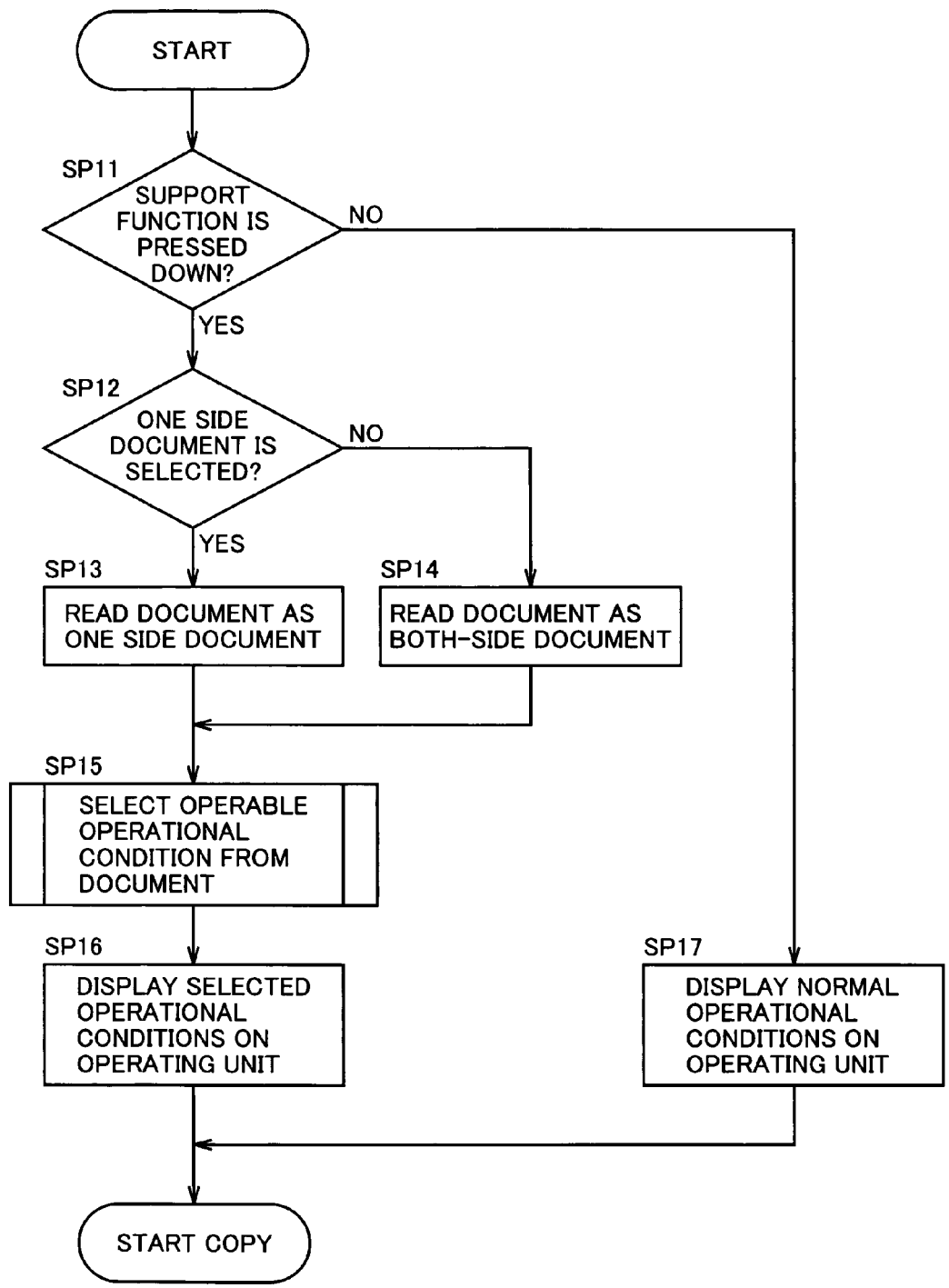
FIG. 9 is a flow chart showing the operation of a control unit in a second embodiment of the present invention wherein an image forming apparatus to is used as a copy machine.

FIG. 9 is a flow chart showing the operation of the control unit 11 when the multi functional printer 10 according to the second embodiment of the present invention is used as a copy machine and this corresponds to FIG. 3 of the first embodiment. With reference to FIG. 2 and FIG. 9, the operation of the control unit 11 in copying with the support function will be described below.

In FIG. 9, steps shown in steps SP11 to SP14 are the same as those shown in steps SP1 to SP4 in FIG. 3 according to the first embodiment, so that the explanation thereof is not reiterated.

After reading the document as either the one side copy or the both-side document by the image reading unit 15 in the step SP13 or the step SP14, the control unit 11 operates as a selection unit in the step SP15 and selects only the operable operational condition from a plurality of operational conditions owned by the multi functional printer 10 on the basis of the read document.

Figure 10:
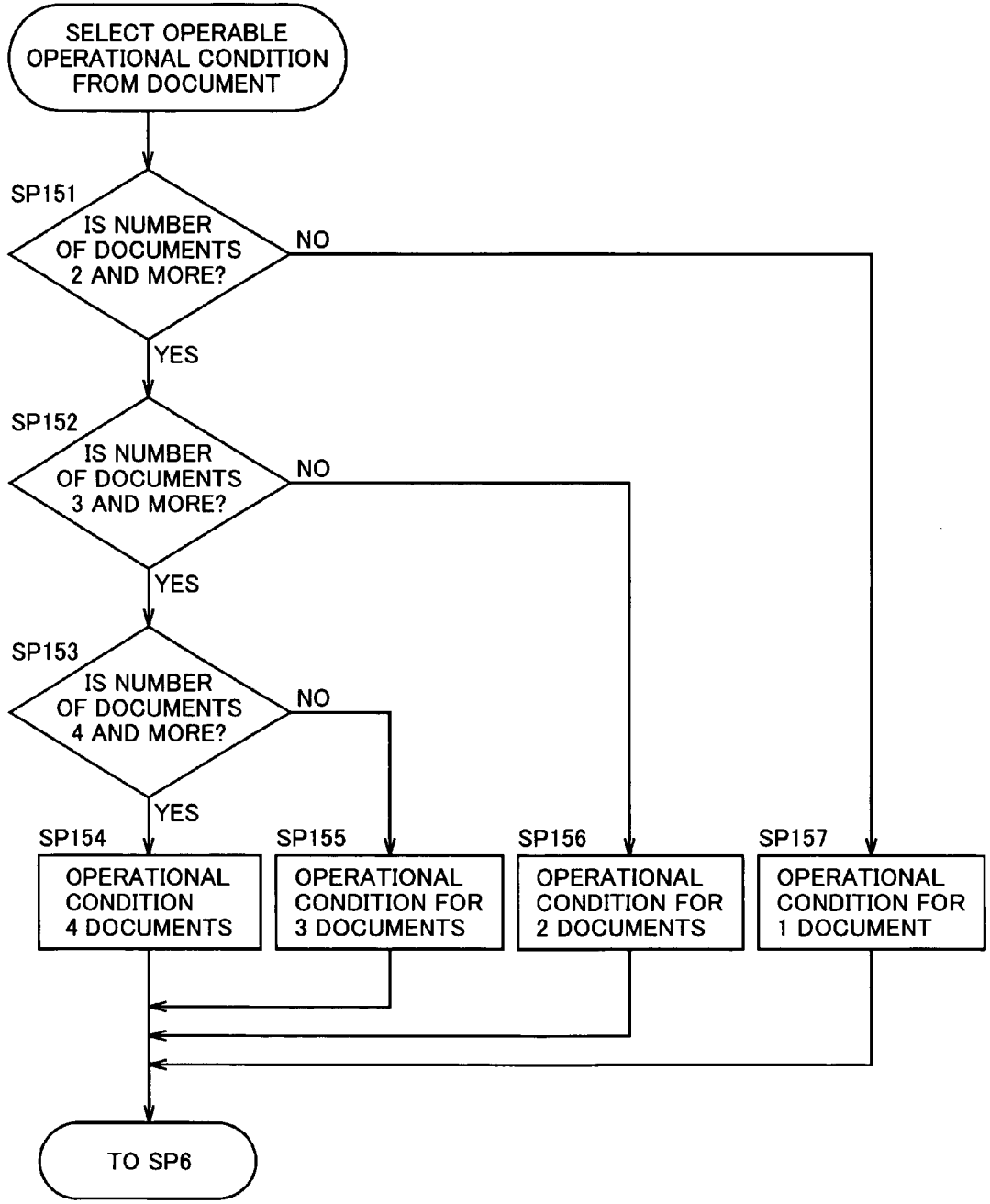
FIG. 10 is a flow chart showing an example of a sub routine for selecting an operable operational condition based on the document.

FIG. 10 is a flow chart showing an example of a subroutine for selecting an operable operational condition from the document, which is shown in SP15 in FIG. 9. In the step SP15, specifically, the operational condition is selected by the procedures as shown in FIG. 10.

At first, in the step SP151, it is determined if the number of the read document is two and more or not. If it is determined that the number of the document is one (NO in step SP151), the operational conditions in the case that the number of the document is one is selected (step SP157). Namely, the operational conditions such as a margin function, a frame delete function, a white and black inversion function, and a mirror image function are selected without including the operational conditions such as a both-side function, an integration function, a sort function, and a staple function.

If it is determined that the number of the document is two and more in the step SP151, it is determined if the number of the document is three and more or not in step SP152. If it is determined that the number of the document is two (NO in the step SP152), the operational conditions in the case that the number of the document is two is selected (step SP156). Namely, the operational conditions such as the both-side function, the integration function, the sort function, and the staple function, the margin function, the frame delete function, the white and black inversion function, and the mirror image function are selected without including the operational conditions such as a 3 in 1 function (the function to copy by integration three documents on one sheet) and a 4 in 1 function.

If it is determined that the number of the document is three and more in the step SP152, it is determined if the number of the document is four and more or not in step SP153. If it is determined that the number of the document is three (NO in the step SP153), the operational conditions in the case that the number of the document is three is selected is selected (step SP155). Namely, the operational conditions such as the both-side function, the integration function, the sort function, the staple function, the margin function, the frame delete function, the white and black inversion function, the mirror image function, and the 3 in 1 function are selected without including the operational condition such as a 4 in 1 function.

If it is determined that the number of the document is four and more (YES in the step SP153) in step SP153, the operational conditions in the case that the number of the document is four and more is selected (step SP154). Namely, the operational conditions such as the both-side function, the integration function, the sort function, the staple function, the margin function, the frame delete function, the white and black inversion function, the mirror image function, the 3 in 1 function, and the 4 in 1 function are selected.

Figure 11:
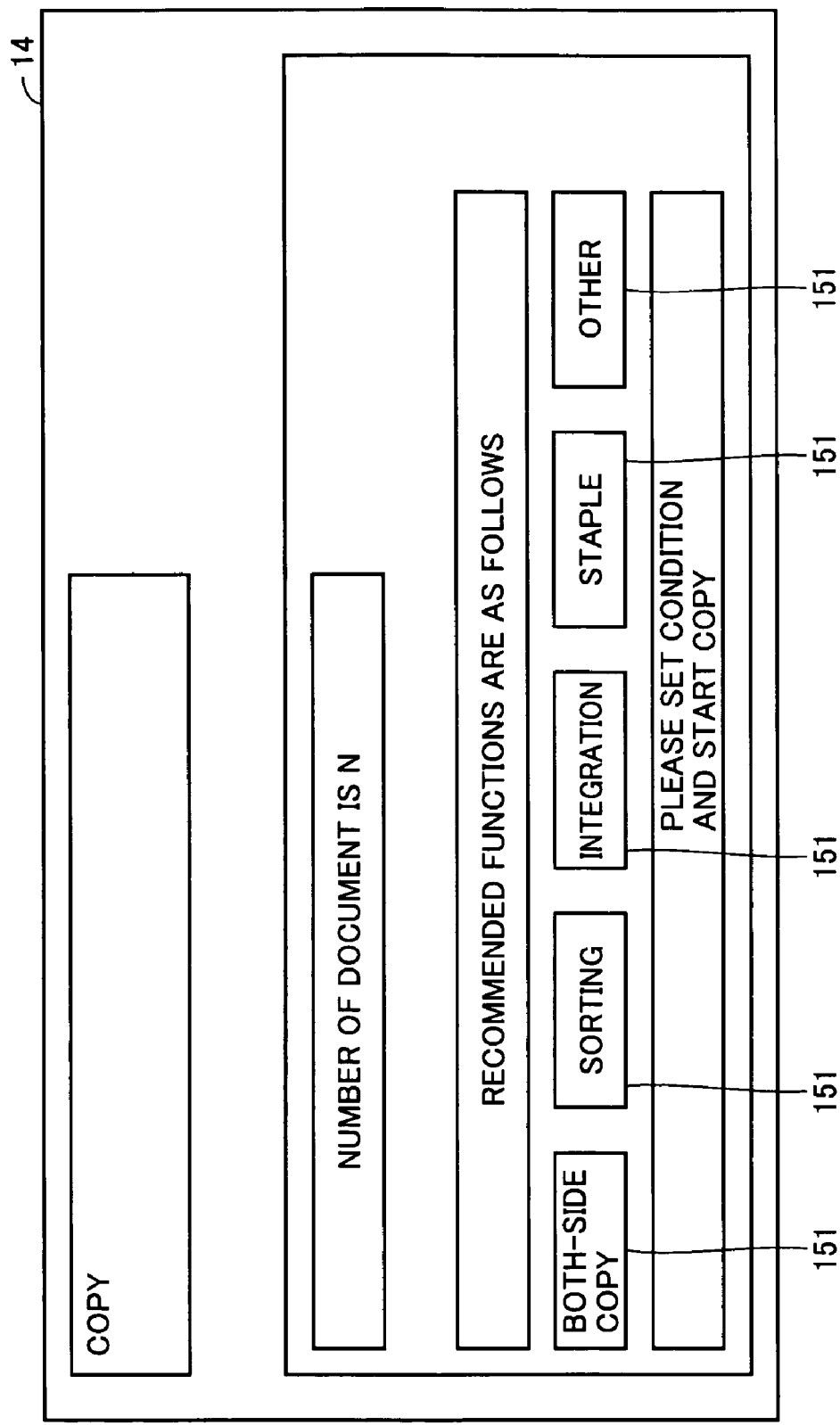
FIG. 11 illustrates an example of a display screen wherein a corresponding condition setting keys are displayed on the operating unit when the number of the documents is four and more.

Returning to FIG. 9, after selecting only the operable operational conditions, condition setting keys 151 only corresponding to the operable operational conditions are displayed on the operating unit 14 in the step SP16. This example is shown in FIG. 11. In FIG. 11, the condition setting keys 151 corresponding to the case that there are four and more of the document is displayed on the operating unit 14.

With reference to FIG. 11, the number of the documents read by the image reading unit 15 and condition setting keys 151 corresponding to the operable operational condition on the basis of the number of the read document such as the both-side function, the sort function, the integration function, the staple function, and the other functions are displayed as "recommended functions" on the operating unit 14. The user sets the condition by selecting keys among the above-described displayed condition set key 151 and starts to copy.

As described above, according to this embodiment, since only the operable operational conditions are displayed on the operating unit 14 in forming an image on the basis of the result of reading the document such as the number of document read by the image reading unit 15, the user is prevented from selecting the condition that cannot be operated by mistake and the desired operational condition can be easily set from the display screen.

According to the present embodiment, as an example to select the operable operational condition from the document, the case of selecting and displaying the operational condition on the basis of the number of the read document is described. However, the present invention is not limited to this example, and the operational condition is selected and displayed on the basis of the image data of the read document. For example, when a monochrome document is to be copied, the condition set keys relating to a full color printing may not be displayed on the operating unit 14. Thus, the user can select the operational condition more easily in forming an image.

According to this embodiment, the condition setting keys 151 corresponding to the operational condition that has been determined to be inoperable on the basis of the document is not displayed on the operating unit 14 at all. However, it is also possible to display the condition setting key 151 in a manner that the key 151 corresponding to the operable operational condition is lighted brightly, whereas the key 141 corresponding to the operational condition that has been determined to be not operable is lighted dimly. By this, the user is prevent from pressing the condition setting keys 151 corresponding to the operational conditions that can not be operated and all the operational conditions owned by the multi functional printer 10 are displayed on the operating unit 14 in advance. As a result, the user can recognize all the operational conditions owned by the multi functional printer 10 upon operation.

In the meantime, according to the above-described embodiment, the condition setting keys 151 corresponding only to the operable operational conditions are displayed on almost entire region of the operating unit 14. However, the present invention is not limited to this example, and it is possible to utilize the basic setting screen shown in FIG. 2 and the above-described condition setting keys 151 are displayed in addition to this basic screen. Thus, the user can set the desired condition from all the operational conditions owned by the multi functional printer 10, so that the user's range of selection expands.

Further, the display may be additionally made on the operating unit 14 that the operational condition is displayed by using the support function key. Thus, it is possible for the user to clearly recognize if the operating unit displays the operational condition by using the support function or not.

3. Third Embodiment

Figure 12:
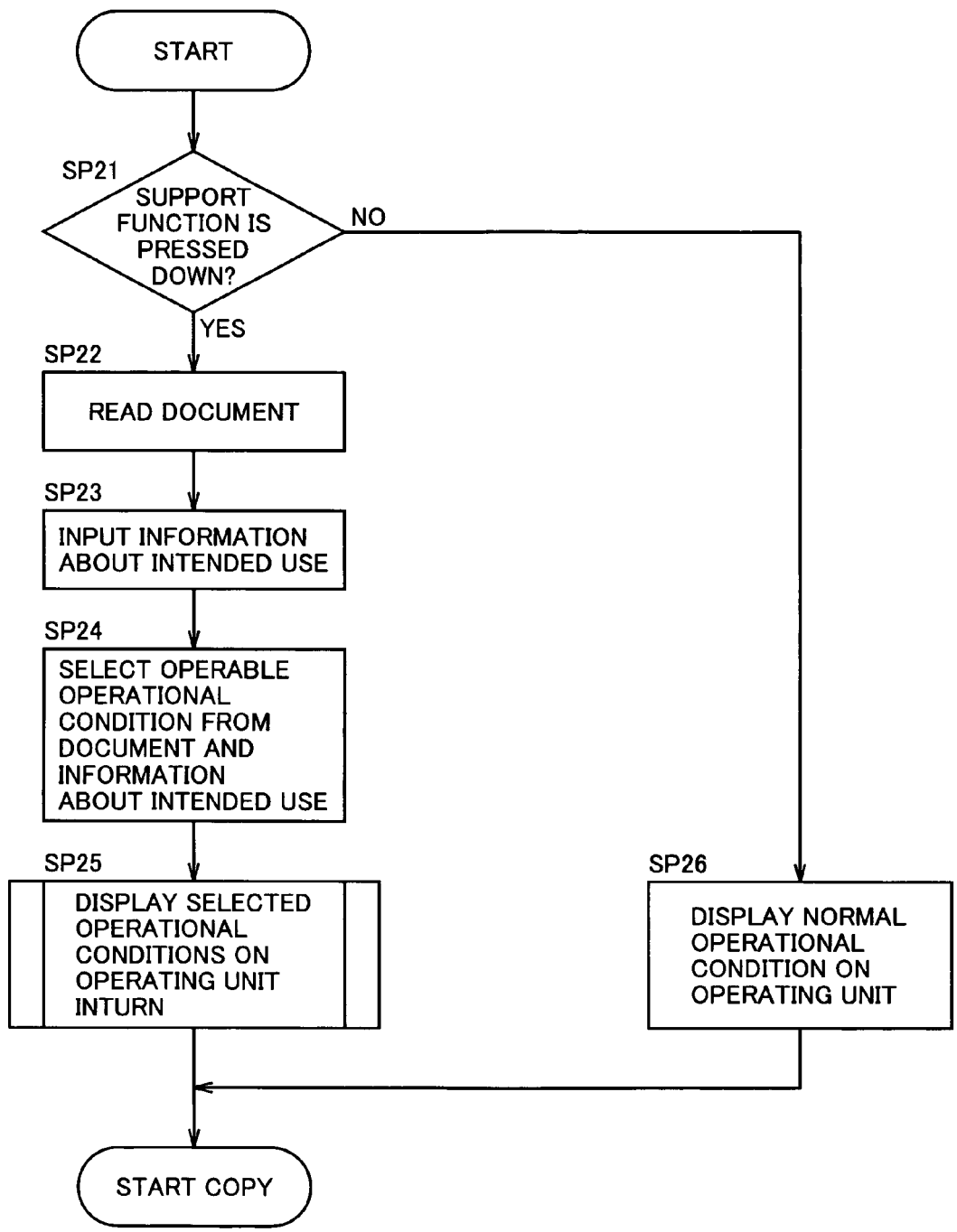
FIG. 12 is a flow chart showing the operation of the control unit in a third embodiment of the present invention wherein an image forming apparatus is used as a copy machine.

Next, a third embodiment according to the present invention will be described below. FIG. 12 is a flow chart showing the operation of the control unit according to the present embodiment. With reference to FIG. 2 and FIG. 12, the operation of the control unit 11 in copying the document using the support function will be described below.

In the step SP21, when the support function key 142 is pressed down (YES in the SP21), the image reading unit 15 reads the document set by the user by the automatic document feeder or the document table (SP22).

After reading the document, the user is made to input the information about the intended use in forming an image in the step SP23. In this case, the display example of the operating unit 14 for making the user input the information about the intended use is the same as FIG. 5 shown in the first embodiment and the number of the read document, an inquiry of "what is an intended use?" to prompt the user to input the information about the intended use, and as the intended use, "resource saving", "for meeting", "image processing", and "others" are displayed. After the intended use is inputted, the operable operational condition in accordance with each intended use is selected based on the read document and the information about the intend use inputted by the user (SP24).

After the operable operational conditions are selected, the operable operational conditions are displayed in turn on the operating unit 14 for each operational condition in step SP25.

If the user does not press down the support function key 142 (NO in the step SP21), the normal operational condition shown in FIG. 2 is displayed on the operating unit 14 in step SP26.

Next, the operational example of displaying the operational condition on the operating unit 14 in turn shown in the step S25 will be described below.

Figure 13:
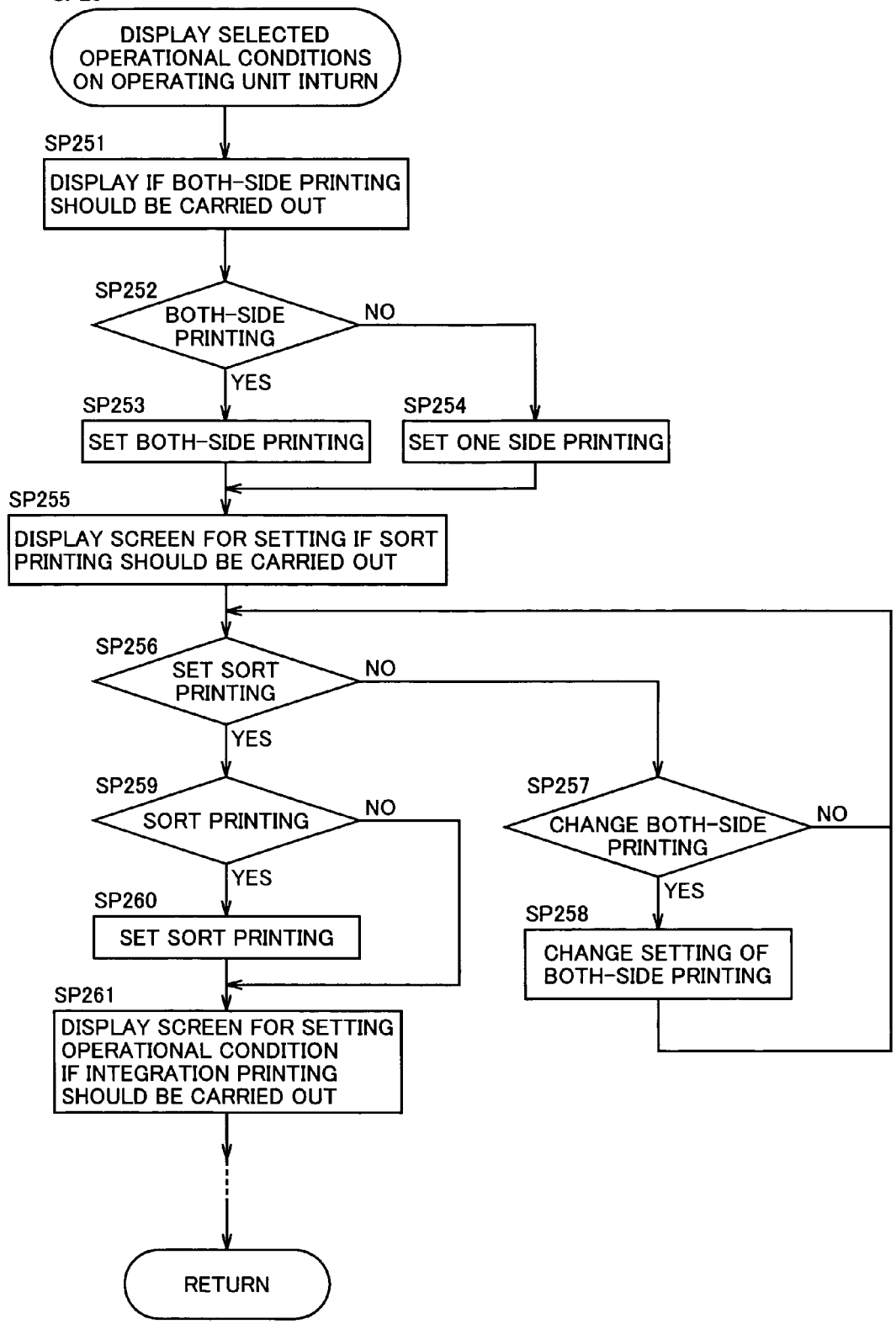
FIG. 13 is a flow chart for displaying the operable operational conditions on the operating unit for each operational condition in turn.

FIG. 13 is a flow chart for displaying the operable operational conditions on the operating unit 14 for each operational condition in turn, which is shown in the step S25.

In this case, same as FIG. 5 according to the first embodiment, the operational example when "resource saving" is inputted as the intended use is illustrated. If "resource saving" is inputted as the intended use, the operational conditions capable of carrying out "resource saving" are displayed on the operating unit 14 in turn. Although the case intended for "resource saving" will be explained here, the similar operations are performed in the cases of "for meeting", "image processing", and "others".

Figure 14:
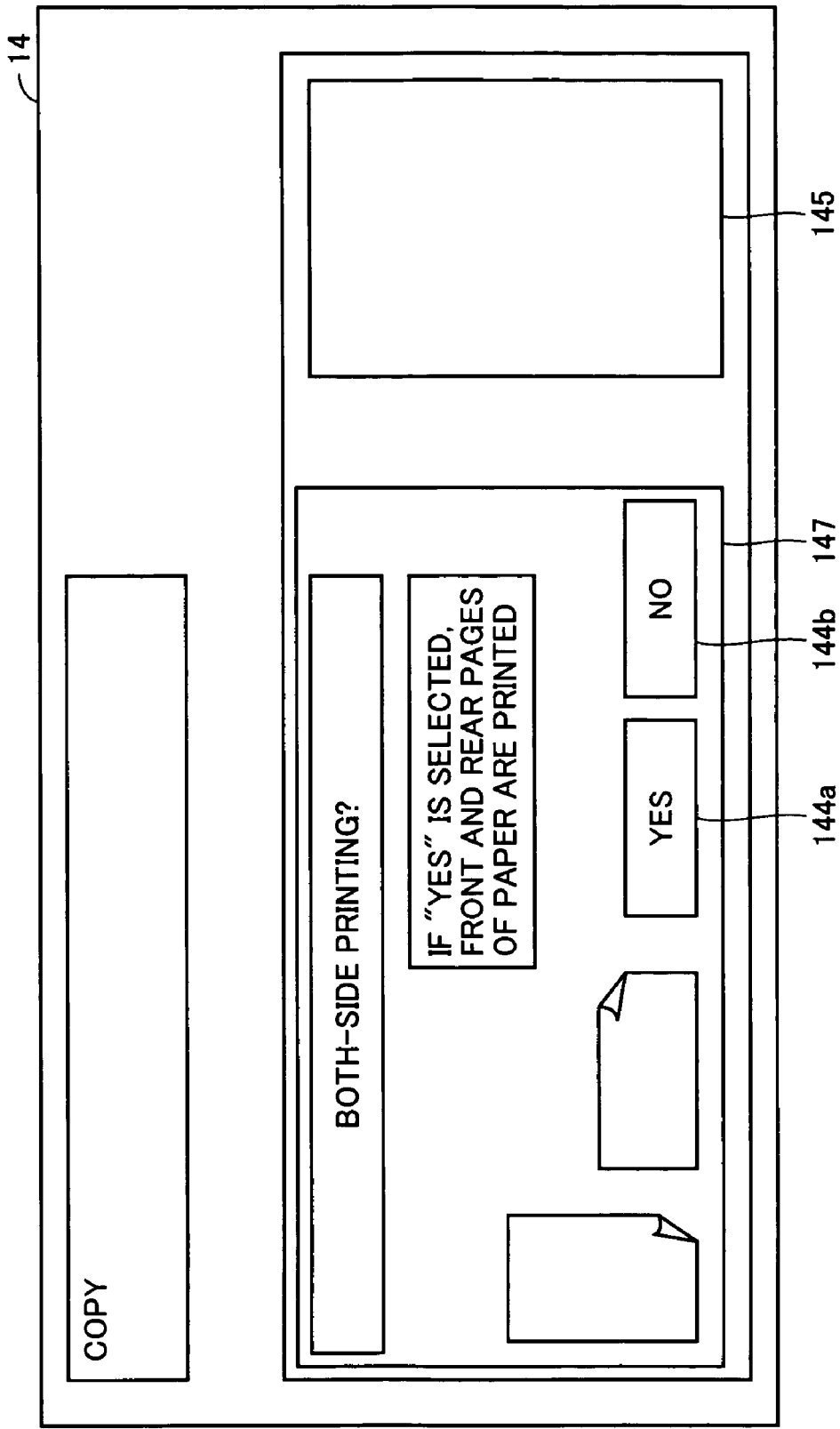
FIG. 14 illustrates an example of a display screen for making the user set if both-side printing is to be carried out or not among the selected operable operational conditions according to the third embodiment.

After the operable operational condition is selected, the display screen for setting if the both-side printing shown in FIG. 14 should be carried out or not is displayed (SP251). The display screen for setting if the both-side printing is to be set shown in FIG. 14 is the same as the display screen shown in FIG. 7. However, the present embodiment is different from the first embodiment in that the operating unit 14 includes an operational condition displaying portion 147 serving as a setting screen for individually setting the operational condition and a set state displaying portion 145 that is provided separate from the operational condition displaying portion 147 and serves to display the set content of the operational condition set by the user.

With reference to FIG. 13 and FIG. 14, an inquiry of "both-side printing?", the explanation about the both-side printing that "if "YES" is selected, front and rear pages of paper are printed", the printing condition view showing the printing condition when the both-side printing is carried out, and the operational condition decision keys 144*a* and 144*b* to decide "YES" or "NO" as an option are displayed. Nothing is displayed on the set state displaying portion 145 because there is no operational condition that has been already set.

In this case, the user sets if the both-side printing should be set or not by pressing down either one of the operational condition decision keys 144*a* and 144*b* to decide "YES" or "NO", (SP252). In the case of carrying out the both-side printing (YES in SP252), the user presses down the operational condition decision key 144*a* to select "YES". Then, as the operational condition, the both-side printing is set (SP253). When the both-side printing is not selected (NO in the SP252), the user presses down the operational condition decision key 144*b* to decide "NO". In this case, the both-side printing is not set but the one side printing is set (SP254).

Figure 15:
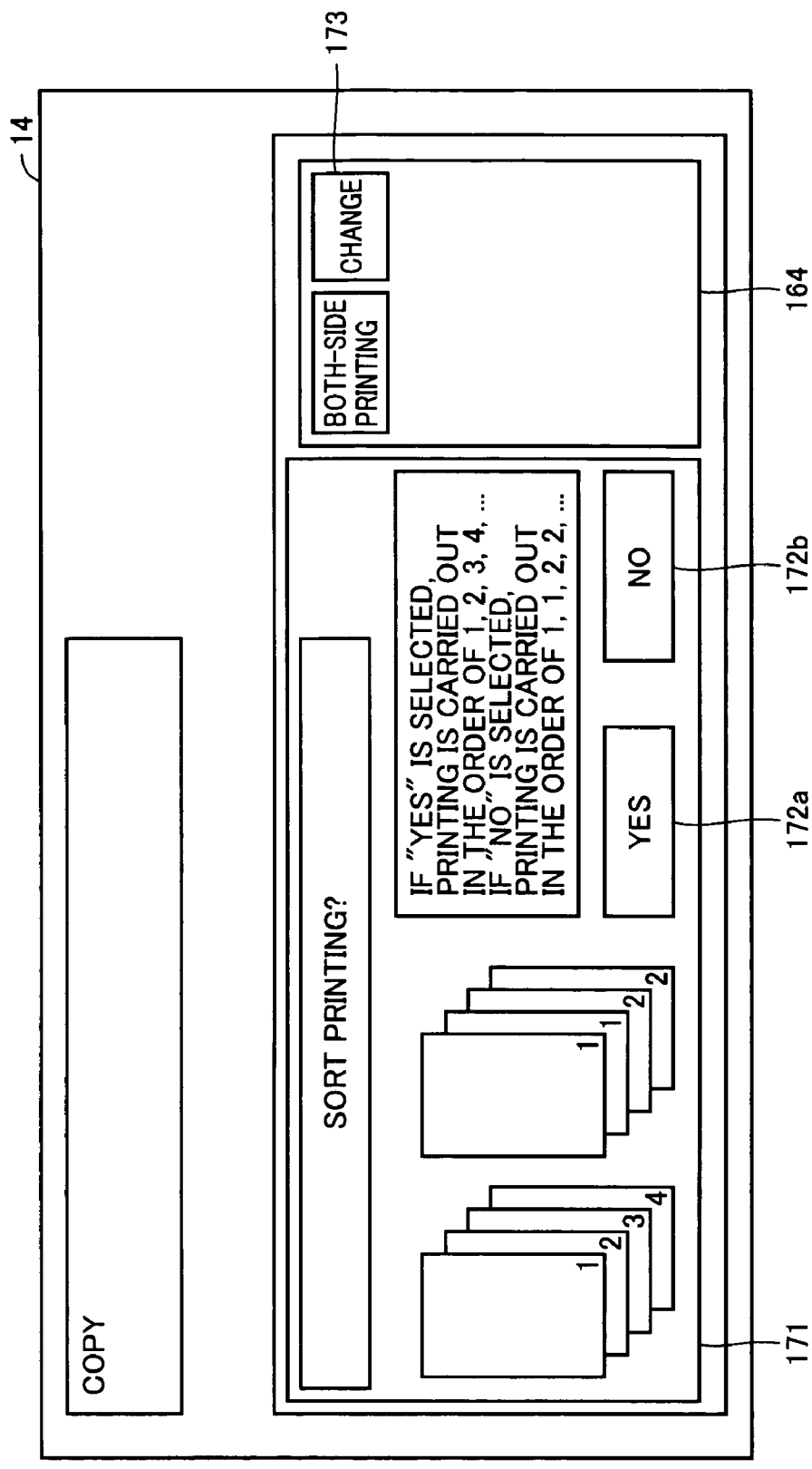
FIG. 15 illustrates an example of a display screen for making the user set if sort printing is to be carried out or not among the selected operable operational conditions.

Subsequently, the display screen for setting if the sort printing should be carried out or not shown in FIG. 15 is displayed (SP255). In this case, an inquiry of "sort printing?", the explanation of the sort printing that "if "YES" is selected, printing is carried out in the order of 1, 2, 3, 4, . . . and if "NO" is selected, printing is carried out in the order of 1, 1, 2, 2, . . . ", the printing condition view showing the printing condition when the both-side printing is carried out, and operational condition decision keys 172*a* and 172*b* to decide "YES" or "NO" as an option are displayed in the displaying portion 171. In addition, the content set on the previous screen, for example, the display of the both-side printing and a set change key 173 are displayed on a set state displaying portion 164. Here, a set change key 173 is the key through which the user requests to change the set content of the operational condition that has been already set without changing the display screen.

In this case, the control unit 11 waits for the user to set either the sort printing as a new operational condition or the change of the operational condition that has been already set (SP256, SP257). When the user changes the set content of the both-side printing without setting the sort printing (NO in the SP256), the user presses down the set change key 173 that is displayed on the set state displaying portion 164 (YES in the SP257). Consequently, in accordance with the user's request, the control unit 11 operates as a set condition changing unit, the set content of the both-side printing is changed into the one side printing (SP258), and the procedure returns to the step SP256.

In the case that the user sets the sort printing (YES in the SP256), the user presses down either one of the operational condition decision keys 172*a* and 172*b* to decide "YES" or "NO" and the user sets if the sort printing should be carried out or not (SP259). In the case of setting the sort printing (YES in the SP259), the user presses down the operational condition decision key 172*a* to decide "YES". Then, as the operational condition, the sort printing is set (SP260) and the sort printing is displayed on the set state displaying portion 164. When the user does not carry out the sort printing (NO in the SP259), the user presses down the operational condition decision key 172*b* to decide "NO". In this case, the sort printing is not set.

After that, the display screen for setting the operational condition if the integration printing should be carried out or not as the next operational condition (S261) and the display screen for setting the operational condition if staple is used or not (not illustrated) are displayed in turn. In addition, on the set state displaying portion 164 of each display screen, the operational condition that has been already set and the setting changing key 173 for changing the set content are displayed. After setting each operational condition displayed on an operational condition display portion 171 in turn, the user starts to copy.

As described above, according to this embodiment, by pressing down the set change key 173 provided in the set state displaying portion 164, it is possible to change the operational condition that has been already set without returning to the original set screen. As a result, it becomes easy for the user to change the set content of the operational condition that has been set already.

Although only the case of changing the set content is described in the above embodiment, the present invention is not limited to this example, and a key for canceling the setting may be provided so that the set content may be directly canceled. Thus, the set content can be cancelled without returning to the original set screen through which this setting is made, so that it is possible to save the user's trouble more.

In addition, although an inquiry is made for each operational condition as to whether the set content of the operational condition that has been set is to be modified in the above-described embodiment, the present invention is not limited to this example, and it is also possible to make an inquiry for all operational conditions as to whether the set content of the operational condition that has been set is to be modified after setting all operational conditions.

4. Forth Embodiment

Figure 16:
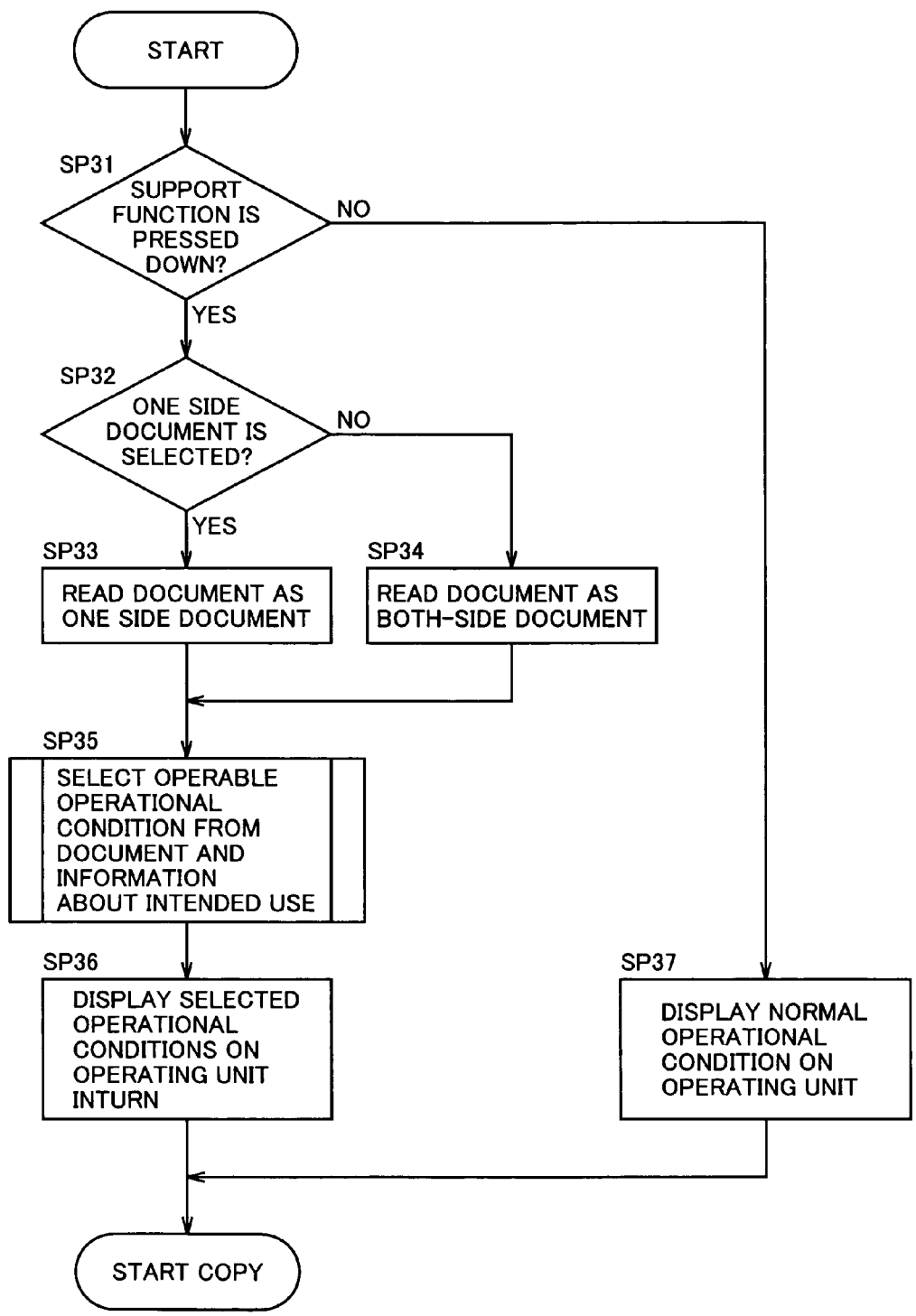
FIG. 16 is a flow chart showing the operation of a control unit in a fourth embodiment of the present invention wherein an image forming apparatus is used as a copy machine.

Next, a forth embodiment of the present invention will be described below. Also according to this embodiment, the control unit 11 selects the operable operational conditions and displays the same on the operating unit 14. FIG. 16 is a flow chart showing the operation of the control unit 11 when the multi functional printer 10 according to the fourth embodiment of the present invention is used as a copy machine. With reference to FIG. 2 and FIG. 16, the operation of the control unit 11 in the case of copying using the support function will be described below.

In this embodiment, the contents shown in the steps SP31 to SP34 shown in FIG. 16 are the same as those shown in the steps SP1 to SP4 shown in FIG. 1. Therefore, the explanation thereof is herein not reiterated.

Figure 17:
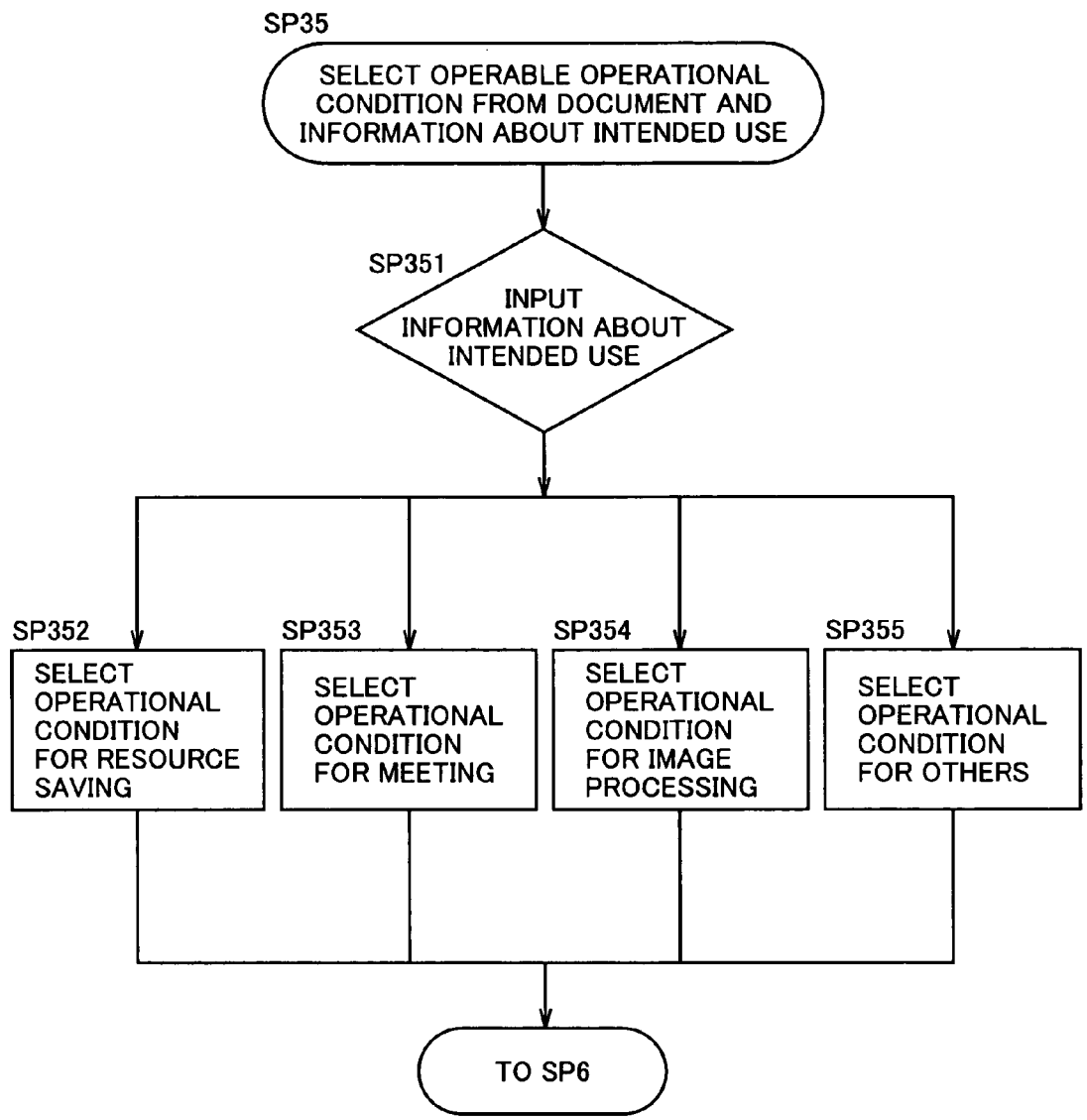
FIG. 17 is a flow chart showing an example of a sub routine for selecting an operable operational condition from the document and the information about the intended use.

In the step SP33 or the step SP34, after reading the document as the one side document or the both-side document by the image reading unit 15, the operable operational condition is selected from the read document and the information about the intended use. FIG. 17 is a flow chart showing an example of a sub routine for selecting an operable operational condition based on the document and the information about the intended use, which is shown in the SP35 in FIG. 16. The display example of the operating porting 14 for making the user input the information about the intended use in this case is the same as that of the first embodiment in FIG. 5.

With reference to FIG. 5 and FIG. 17, after reading the document, the control unit 11 operates as the input unit together with the operating unit 14 to make the user input the information about the intended use in forming an image (step SP351). In this case, as shown in the above-described FIG. 5, the number of the read document, an inquiry of "what is an intended use?" for prompting the user to input the information about the untended use, and the intended use such as "resource saving", "for meeting", "image processing", and "others" are displayed. After making the user input the intended use, the control unit 11 operates as a selecting unit to select the operable operational condition in accordance with the read document and the information about the intended use that is inputted by the user (steps SP352 to 355).

Returning to FIG. 16, selecting the operable operational condition; the control unit 11 operates as a display unit, and in step SP36, the condition setting key corresponding to the selected operable operational conditions are displayed on the operating unit 14. The display example of this case is the same as that shown in FIG. 11 described in the second embodiment.

FIG. 11 illustrates a display example that a condition set keys 151 corresponding to the selected operable operational conditions are displayed on the operating unit 14 in the case that the number of the document is four and more and the intended use of "for meeting" is inputted in FIG. 16. With reference to FIG. 11, the number of the document read by the image reading unit 15 and condition set keys 151, such as the both-side function, the sort function, the integration function, the staple function, and the other functions are displayed as "recommended functions" on the operating unit 14 corresponding to the operable operational condition on the basis of the number of the read document and the information about the intended use inputted by the user. In addition, the display to prompt the user to set the above operational condition and to start copying is also displayed. Setting the condition by the above-described displayed condition set keys 151, the user starts to copy.

As described above, according to this embodiment, since the operable operational condition in forming an image on the basis of the result of reading the document such as the number of document read by the image reading unit 15 and the information about the intended use is displayed on the operating unit 14, the user is prevented from selecting the condition that cannot be operated by mistake and the operation to set the desired operational condition can be easily set from the display screen.

According to the present embodiment, as an example to select the operable operational condition from the document and the information about the intended use, the case of selecting and displaying the operational condition on the basis of the number of the read document and the information about the intended use is described. However, the present invention is not limited to this example, and the operational condition may be selected and displayed on the basis of the image data of the read document and the information about the intended use as in the first embodiment. For example, when the monochrome document is to be copied, the condition set keys relating to the full color document is not displayed on the operating unit 14. Thus, the user can select the operational condition more easily in forming an image.

According to this embodiment, the condition set key 151 corresponding to the operational condition that has been determined to be not operable on the basis of the document and the information about the intend use is not displayed on the operating unit 14 at all. However, it is also possible to display the condition set key 151 corresponding to the operable operational condition by lighting brightly, and the condition set key 151 corresponding to the operational condition that has been determined to be inoperable by lighting dimly. By this, the user is prevented from setting the condition set key 151 corresponding to the operational condition that cannot be operated and the user can recognize all the operational conditions owned by the multi functional printer 10 in advance. As a result, the user can recognize the operational conditions owned by the multi functional printer 10 upon operation and it is also possible to change the intended use in accordance with the operational conditions.

In the meantime, according to the above-described embodiment, the condition setting key 151 only corresponding to the operable operational condition is displayed on almost entire region of the operating unit 14. However, the present invention is not limited to this example, and the above-described condition set key 151 may be displayed in addition to the basic setting screen shown in FIG. 2 as in the second embodiment. Thus, the user can set the desired condition from all operational conditions owned by the multi functional printer 10, so that the range of selection can be expanded.

Further, it is possible to display on the operating unit 14 that the operational condition is displayed using the support function key. Thus, it is possible for the user to clearly recognize if the operating unit displays the operational condition by using the support function or not.

In addition, according to each of the above-described embodiments, the case that the multi functional printer 10 is used as a copy machine is described. However, the operable operational condition for the intended use may also be displayed in the case of using the multi functional printer 10 as a printer or as a facsimile or as a scanner, on the basis of the read document and the received data.

Although the embodiments according to the present invention are described with reference to the drawings, the present invention is not limited to the illustrated embodiments. Various alterations and modifications may be added to the illustrated embodiments within a scope that is identical or equal to the present invention.

What is claimed is:

1. An image forming apparatus, comprising:
    a support function key by which operable operational conditions are displayed;
    a reading unit for reading a document;
    an image forming unit for forming an image on the basis of the document that is read by the reading unit;
    an operating unit for setting an operational condition in forming an image by the image forming unit;
    an input unit for receiving user input information about an intended use of a product to be formed by said image forming apparatus;
    a determination unit to determine whether said support function key is pressed; and
    a display unit on the operating unit for displaying an operable operational condition in forming an image on the operating unit in turn for each operational condition in accordance with a determination result made by the determination unit, a reading result of the document read by the reading unit and the input information about the intended use received by the input unit;
    wherein the image forming unit has one or more predetermined operational conditions;
    the operating unit displays the one or more predetermined operational conditions; and
    the display unit displays the operable operational condition in forming an image with a first brightness among the one or more predetermined operational conditions and displays an inoperable operational condition with a second brightness that is dimmer than the first brightness.

* * * * *